United States Patent [19]
Luhman et al.

[11] Patent Number: 5,503,112
[45] Date of Patent: Apr. 2, 1996

[54] METHOD FOR SELECTING RUMINANT FEED COMPOSITION USING ABOMASAL INFUSION

[75] Inventors: Cindie M. Luhman, Jewell; Bill L. Miller; Robert DeGregorio, both of Fort Dodge, all of Iowa

[73] Assignee: Land O'Lakes, Inc., Arden Hills, Minn.

[21] Appl. No.: 263,600

[22] Filed: Jun. 22, 1994

[51] Int. Cl.⁶ ................................................ A01K 29/00
[52] U.S. Cl. ............................................ 119/174; 426/807
[58] Field of Search ........................... 119/174, 51.01; 426/635, 636, 807

[56] References Cited

U.S. PATENT DOCUMENTS 4,112,069 9/1978 Huber ........................................ 119/174

OTHER PUBLICATIONS

J. P. Cant et al., *Mammary Amino Acid Utilization in Dairy Cows Fed Fat and Its Relationship to Milk Protein Depression*, Journal of Dairy Science, vol. 76, No. 3, pp. 762–774 (1993).

R. R. Grummer et al., *Lactation Response to Short–Term Abomasal Infusion of Choline, Inositol, and Soy Lecithin*, Journal of Dairy Science, vol. 70, No. 12, pp. 2518–2524 (1987).

C. G. Schwab et al., *Response of Lactating Dairy Cows to Abomasal Infusion of Amino Acids*, Journal of Dairy Science, vol. 59, No. 7, pp. 1254–1270.

B. K. Sharma et al., *Abomasal Infusion of Choline and Methionine With or Without 2–Amino–2–Methyl–1–Propanol for Lactating Dairy Cows*, Journal of Dairy Science, vol. 71, No. 9, pp. 2406–2411 (1988).

Primary Examiner—Todd E. Manahan
Attorney, Agent, or Firm—Kinney & Lange

[57] ABSTRACT

The present invention includes a method of formulating ruminant feed to selectively change a composition of milk produced by the ruminant. The method includes providing a fistula directly into an abomasum of the ruminant. A selected feed component at a selected level is introduced directly into the abomasum through the ingress. The selected feed component thereby bypasses other portions of the ruminant's stomach. The direct introduction of the selected feed component allows for changing a selected characteristic of the composition of milk. The composition of the milk corresponding to the selected feed component is then analyzed. The direct introduction of the selected feed component is repeated, if necessary, at other selected levels. The milk produced corresponding to the other selected levels is then analyzed. A selected quantity of the rumen inert feed component to be fed orally to the ruminant is determined by utilizing the analysis of the composition of the milk corresponding to the introduction of the selected feed component into the abomasum of the ruminant.

8 Claims, 2 Drawing Sheets

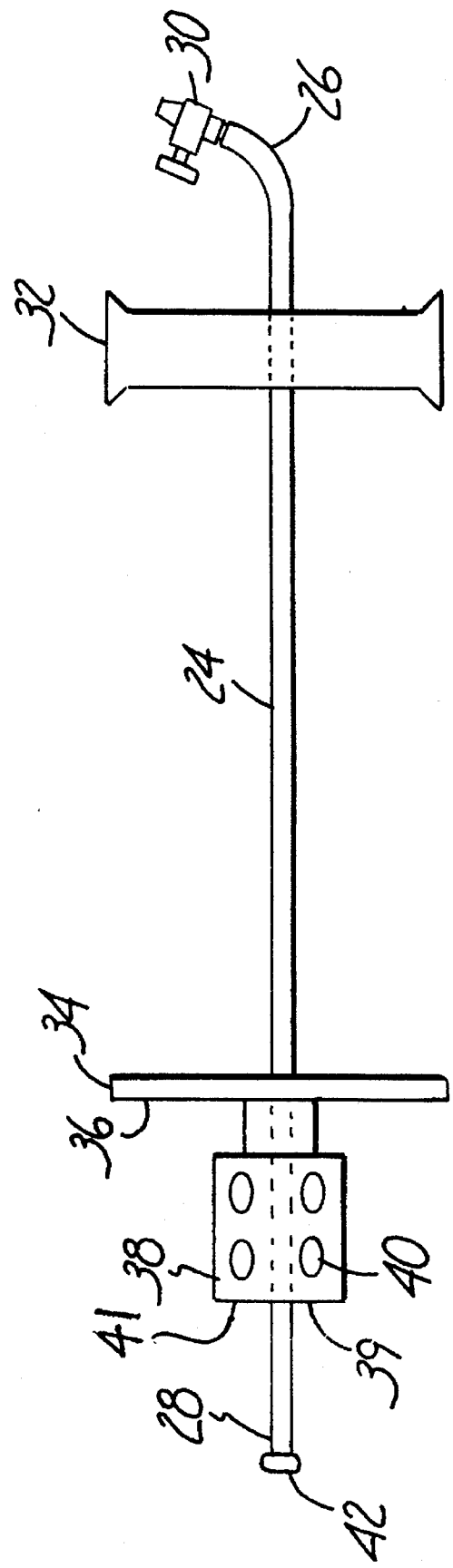

METHOD FOR SELECTING RUMINANT FEED COMPOSITION USING ABOMASAL INFUSION

BACKGROUND OF THE INVENTION

The present invention relates generally to a method of formulating lactating bovine rations. More particularly, the present invention relates to a method for obtaining desired changes in milk composition by formulating rations based on results obtained from abomasal infusion trials. This method allows the determination of the effects of ration ingredients that are not rumen protected. It allows for results of trials much more quickly than conventional feeding trials and it provides a practical formulation technology which was not possible before.

The composition of milk is increasingly becoming a concern to the diary industry because health conscious consumers desire a milk composition that has a decreased fat and saturated fat concentration and an increased protein concentration. If the diary industry is able to change the fat and protein composition of raw milk produced by cows, the dairy industry would be able to provide consumers with more of the products health conscious consumers prefer. Additionally, decreasing the fat concentration and increasing the protein concentration in raw milk would allow the diary industry to reduce the cost of processing raw milk into certain marketable products. It is also desirable to alter the fatty acid composition of the raw milk so that the fat in raw milk produced by cows is more healthful and requires less alteration during processing.

It is known that the composition of milk can be changed through the judicious feeding of different feed additives or feeds to cows. For example, a ration that promotes a low acetate to propionate ratio in volatile fatty acids produced in the rumen of the cow causes a significant decrease in milk fat percentage and minor increase in milk protein percentage. A problem with feeding cows a ration that promotes these beneficial characteristics is that the ration frequently cause health problems in the cows that consume it. The health problems include laminitis, displaced abomasum, and ruminal parakeratosis.

In addition to possible health problems, the ability to change milk composition by changing a cow's diet is limited because of alteration that the rations undergo in the rumen. For example, unsaturated fatty acids are readily hydrogenated in the rumen. Proteins are digested. Other compounds are altered, fermented, or cleaved. To avoid these undesired changes, the components in the ration must be processed so that the components are not modified in the rumen. The processed components that are resistant to modification in the rumen are referred to as rumen inert components. Once the rumen inert components pass through the rumen the rumen inert components are digested in the cow's abomasum and are absorbed in the small intestine.

The current practice is to modify ration components to make them rumen inert before it is known whether the ration components have a beneficial effect on the composition of milk. The ration components are then fed to cows and then the effect on milk composition is studied. Thus, researchers must go through the time and expense that is necessary to make ration components rumen inert before it is known whether the ration components will have a beneficial effect on the composition of the milk produced by the cow.

SUMMARY OF THE INVENTION

The present invention includes a method of formulating ruminant feed by selectively changing a composition of milk produced by the ruminant. The method includes providing a fistula directly into an abomasum of the ruminant. A selected feed component at a selected level is directly introduced into the abomasum through the ingress. The selected feed component thereby bypasses other portions of the ruminant's stomach. The direct introduction of the selected feed component allows for changing a selected characteristic of the composition of milk. The composition of the milk corresponding to the selected feed component is then analyzed. The direct introduction of the selected feed component is repeated, if necessary, at other selected levels. The milk produced corresponding to the other selected levels is then analyzed. A selected quantity of the feed component to be fed orally to the ruminant is determined by utilizing the analysis of the composition of the milk corresponding to the introduction of the selected feed component into the abomasum of the ruminant.

BRIEF DESCRIPTION OF THE DRAWINGS

FIG. 2 is a diagram of the device for use with the present method.

DETAILED DESCRIPTION OF THE PREFERRED EMBODIMENTS

Figure 1:
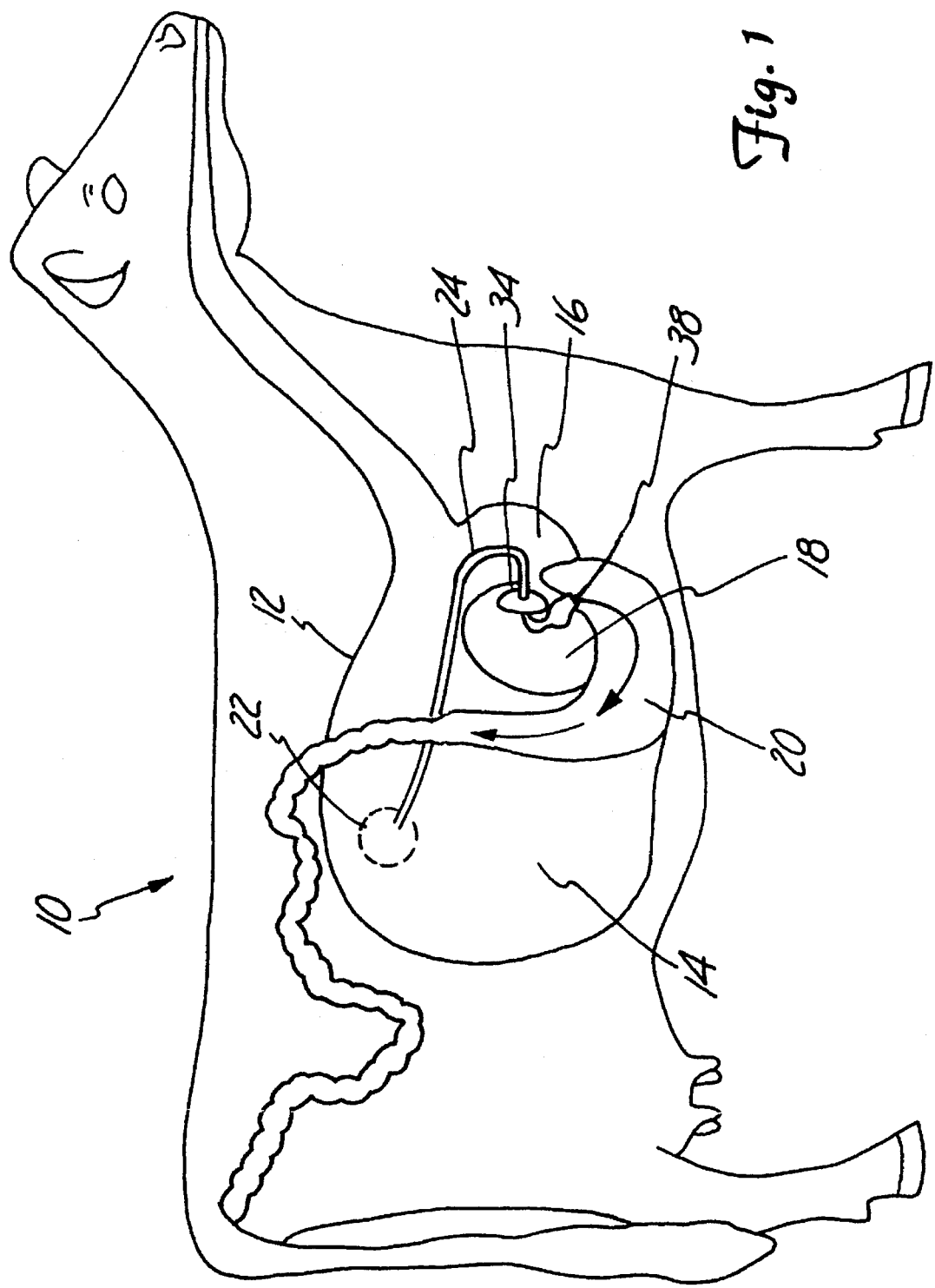
FIG. 1 is a diagram of a cow equipped with a device for use of the present method.

The present invention includes a method for formulating ruminant feed composition. In the method of the present invention, a cow 10 is fitted with an abomasal infusion tube 24, as illustrated in FIG. 1. Then a selected feed component is infused into an abomasum 20 through the abomasal infusion tube 24. Samples of milk produced by the cow are collected and the samples are examined to determine what effect the infused component had on the composition of the milk.

Selection of feed composition for a cow is complicated because of a cow's digestive tract. The cow's digestive tract includes a stomach 12 that has four sections-rumen 14, reticulum 16, omasum 18, and the abomasum 20. The four sections in the stomach 12 can affect digestion of a component passing through the stomach 12 because each section serves a different function in the digestive process.

Within the rumen 14, food mixed with saliva is churned in a coordinated motion. The food mixture undergoes some fermentation and bacterial digestion in the rumen 14. The mixture of food and saliva then passes to the reticulum 16 where the mixture is formed into a cud that can be regurgitated. After thorough chewing of the regurgitated cud, the cud is re-swallowed. Digesta passes from the rumen 14 to the omasum 18, dependent on particle size. While in the omasum 18, the mixture is additionally mixed to maintain it in a homogeneous state and to remove fluid. Then the homogeneous mixture is passed to the abomasum 20 where gastric digestion occurs.

The abomasal infusion tube 24 used with the method of the present invention has an input end 26 and an output end 28, as illustrated in FIG. 2. The abomasal infusion tube 24 is preferably between four and eight feet long and has a diameter of between ¼ of an inch and 1 inch.

A stopcock 30 is affixed to the input end 26 of the abomasal infusion tube 24. The stopcock 30 allows for closure of the tube. The rate of infusion can be controlled by connection to a pump system. When in a closed position, the stopcock 30 prevents undesired objects, like dirt, bacteria, and water, from entering the abomasum 20 and abomasal contents from leaking into the tube.

A rumen cannula plug 32 is attached to the abomasal infusion tube 24 about eight inches from the input end 26. The rumen cannula plug 32 provides a seal against the rumen cannula 22 and thereby prevents undesired substances, such as dirt and bacteria, from entering the rumen 14 and/or ruminal contents from leaking out.

Preferably, a rubber flange 34 is attached to the abomasal infusion tube 24 approximately seven inches from the output end 28. The flange 34 has a first major surface 36 that is oriented towards the output end 28. The flange 34 has a diameter that is greater than the diameter of the junction between the reticulum 16 and the omasum 18. The flange 34 thereby retains the abomasal infusion tube 24 in the omasum 18.

Preferably, a 60 milliliter bottle 38 is retained adjacent to the first major surface 36 between the flange 34 and output end 28. The bottle 38 prevents the output end 28 from laying against a side of the abomasum 20. An end 39 of the bottle 38 opposite the first major surface 36 has an opening 41. In addition, the bottle 38 has a plurality of apertures 40. The opening 41 and the apertures 40 permit material in the omasum 18 and the abomasum 20 to flow through the bottle 38.

A flap valve 42 may be attached to the output end 28. The flap valve 42 opens to permit infusion fluid to pass through the abomasal infusion tube 24 and into the abomasum 20. However, the flap valve 42 prevents material in the abomasum 20 from flowing into the abomasal infusion tube 24.

In the method of the present invention, the cow 10 is surgically fitted with a rumen cannula 22. Fitting of the rumen cannula 22 in the cow is known in the art.

An abomasal infusion tube 24 is inserted through the rumen cannula 22. The output end 28 of the abomasal infusion tube 24 is fed through the rumen cannula 22 and into the rumen 14. The output end 28 is then fed through the reticulum 16 and omasum 18 and toward the abomasum 20. While directing the output end 28 in the abomasum 20, care must be exercised so as to avoid damaging the wall of the stomach 12.

When inserting the flange 34 into the abomasum 20, the flange 34 is held so that it is adjacent to the bottle 38. The flange 34 and bottle 38 are then fed through the junction between the reticulum 16 and the omasum 18 and into the abomasum 20. Once in the abomasum 20, the flange 34 is released and returns to an unbent configuration. Because the flange 34 is larger than the junction between the reticulum 16 and the omasum 18, the flange 34 and the accompanying output end 28 are retained in the abomasum 20. Finally, the rumen cannula plug 32 is used to seal the rumen cannula 22.

The abomasal infusion tube 24 enables selected feed components to be infused directly into the abomasum 20 without undergoing the alteration that occurs in the rumen 14. As noted above, unsaturated fatty acids are readily hydrogenated in the rumen 14. In addition, proteins are broken down in the rumen 14. Therefore, it is difficult for researchers to determine the effects the selected feed component may have on the milk composition.

Common research practice is to select a test component that may or may not have a beneficial impact on the composition of milk when it is fed to cows. Once selected, the feed component is modified to make it rumen inert. Finally, the rumen inert feed component is fed to cows and the effect on milk composition is studied.

Direct abomasal infusion, on the other hand, enables researchers to study whether the feed component produces a desired change in milk composition before expending the time and expense necessary to make the feed component rumen inert. In one typical test, shortly before abomasal infusion was to begin, the feed components were prepared. Water soluble feed components were dissolved in water. Fat soluble feed components were dissolved in corn oil. Solid feed components were melted and infused warm. After the feed components were prepared, the feed component to be infused was warmed to the approximate body temperature of the cow.

The feed components were then infused into the abomasum 20 of the cow 10 through the abomasal infusion line 24. The abomasal infusions were done three times a day with the time between the infusions kept as equal as possible. The infusions were generally repeated for a period of two weeks. Feed components were selected for possible effects on milk protein content, fat content, flavor, or fatty acid composition.

After infusing the feed component, the abomasal infusion tube 24 was rinsed by infusing 50 milliliters of warm water through the abomasal infusion tube 24. Samples of milk were collected from the cows after 3, 7, and 14 days of infusion. In addition, the day before infusion testing was to begin, milk samples were collected. The milk samples collected before the start of infusion provided a baseline to compare the other samples.

The milk samples were examined for milk protein, non-protein nitrogen, fat, solids, and ash. Milk true protein and lactose content were then calculated. In addition, for some feed components, the milk samples were analyzed for fatty acid concentrations.

When promising feed components were found, research was performed to make the selected feed components rumen inert. Next, feeding trials were conducted on cows to establish if the rumen inert modified feed component would produce a change in the milk composition that was similar to the abomasal infusion of the feed component.

The method of the present invention is described in the following examples. These examples are provided as an illustration of the invention and are not intended to limit the invention.

EXAMPLE 1

Methionine was abomasally infused at a rate of 10 grams per cow per day for a fourteen day period. Four cows were used in Trial 1 and three cows were used in Trial 2. Results obtained from the methionine infusion trials are contained in Table 1. On average, the percentage of protein, fat, and total solids concentrations in milk increased. In Trial 1, the fat percentage increased significantly in only two cows and only slightly in the other two cows. In Trial 2, fat percentage increased 0.27 percentage point over the fourteen day trial and the protein concentration increased 0.22 percentage points over the fourteen day trial.

TABLE 1

| | Methionine Infusion | | | | |
|---|---|---|---|---|---|
| | Day 0 | Day 3 | Day 7 | Day 14 | Day 14– Day 0 |
| Trial 1 | | | | | |
| Ash (%) | 0.72 | 0.72 | 0.71 | 0.70 | −0.02 |
| Lactose (%) | 4.77 | 4.92 | 4.87 | 4.74 | −0.03 |
| Fat (%) | 3.72 | 3.93 | 4.00 | 4.23 | 0.51 |
| Protein (%) | 3.22 | 3.17 | 3.26 | 3.31 | 0.09 |

TABLE 1-continued

| | Methionine Infusion | | | | |
|---|---|---|---|---|---|
| | Day 0 | Day 3 | Day 7 | Day 14 | Day 14–Day 0 |
| Non-Protein Nitrogen (%) | 0.23 | 0.20 | 0.22 | 0.21 | −0.03 |
| Total Protein (%) | 2.99 | 2.97 | 3.04 | 3.10 | 0.12 |
| Total Solids (%) | 12.43 | 12.70 | 12.83 | 12.87 | 0.44 |
| Trial 2 | | | | | |
| Ash (%) | 0.58 | 0.56 | 0.58 | 0.58 | 0.0 |
| Lactose (%) | 5.11 | 4.84 | 4.94 | 4.87 | −0.24 |
| Fat (%) | 3.06 | 3.16 | 2.84 | 3.33 | 0.27 |
| Protein (%) | 2.65 | 2.65 | 2.78 | 2.87 | 0.22 |
| Non-Protein Nitrogen (%) | 0.21 | 0.21 | 0.22 | 0.22 | 0.01 |
| Total Protein (%) | 2.44 | 2.44 | 2.56 | 2.65 | 0.21 |
| Total Solids (%) | 11.40 | 11.21 | 11.00 | 11.65 | 0.25 |

Because methionine produced desired changes in milk composition steps were taken to secure a rumen inert methionine source. Then feeding trials were conducted using the rumen inert methionine.

Rumen inert methionine in the form of methionine hydroxy analog at a rate of 10 grams per cow per day of methionine was fed to six cows in early lactation. A control group of six additional cows were fed a basal ration. The feeding was continued for three weeks. Milk samples were taken weekly and analyses of milk fat and protein concentration were performed.

As illustrated in Table 2, milk protein concentration was increased by 0.1 percentage points as would be expected from trials done with infusion of methionine. The milk fat concentration was also increased 0.06 percentage points from infusion of rumen inert methionine.

TABLE 2

| | Rumen Inert Infusion of Methionine | |
|---|---|---|
| | Crude Milk Protein Concentration (%) | Milk Fat Concentration (%) |
| Rumen Inert Methionine Infusion | 2.91 | 3.47 |
| Control | 2.81 | 3.41 |

The results of the rumen inert infusion of methionine indicates that ration formulations designed utilizing results from abomasal infusion trials will yield the same results. Therefore, abomasal infusion trials can be used as a screening process to design rations to alter milk composition.

EXAMPLE 2

Lysine was abomasally infused at a rate of 20 grams per cow per day for a fourteen day period. One trial was done using lysine infusion. The trial was performed using three cows. The results of the lysine infusion trials are reported in Table 3. Infusion of lysine increased the protein percentage in the milk over the fourteen day trial. The percentage of fat and total solids in the milk were increased at Day 3 and Day 14 when compared to Day 0.

TABLE 3

| | Lysine Infusion | | | | |
|---|---|---|---|---|---|
| Trial 1 | Day 0 | Day 3 | Day 7 | Day 14 | Day 14–Day 0 |
| Ash (%) | 0.68 | 0.67 | 0.69 | 0.69 | 0.1 |
| Lactose (%) | 4.64 | 4.72 | 4.75 | 4.72 | 0.08 |
| Fat (%) | 2.87 | 3.89 | 2.30 | 3.09 | 0.22 |
| Protein (%) | 2.55 | 2.50 | 2.56 | 2.67 | 0.12 |
| Non-Protein Nitrogen (%) | 0.20 | 0.22 | 0.20 | 0.20 | 0 |
| Total Protein (%) | 2.35 | 2.28 | 2.36 | 2.47 | 0.12 |
| Total Solids (%) | 10.73 | 11.77 | 10.30 | 11.17 | 0.44 |

EXAMPLE 3

Soy oil was infused into the abomasum at an amount of 0.45 kilograms per cow per day. The results from soy oil infusion are reported in Table 4. Table 4 also includes a concentration of fatty acids in the soy oil. The changes in milk fat were consistent with the fatty acids composition of the soy oil. The primary fatty acids replaced in milk were myristic and palmitic. These fatty acids are long chain saturates, which are synthesized in the mammary gland.

TABLE 4

| | Soy Oil Infusion | | |
|---|---|---|---|
| | Day 0 | Day 3 | Oil |
| Ash (%) | 0.715 | 0.71 | |
| Lactose (%) | 4.86 | 4.98 | |
| Fat (%) | 3.20 | 3.53 | 100 |
| Protein (%) | 2.82 | 2.86 | |
| Total Solids (%) | 11.58 | 12.34 | |
| Butyric (C4) | 4.43 | 4.54 | |
| Caproic (C6) | 2.53 | 2.46 | |
| Caprylic (C8) | 1.47 | 1.43 | |
| Capric (C10) | 3.36 | 3.36 | |
| Lauric (C12) | 3.61 | 3.41 | |
| Myristic (C14) | 11.36 | 10.22 | |
| Myristoleic (C14:1) | 0.99 | 0.68 | |
| Palmitic (C16) | 30.99 | 27.09 | 9.9 |
| Palmitoleic (C16:1) | 2.12 | 1.35 | |
| Stearic (C18) | 11.91 | 11.12 | 3.6 |
| Oleic (C18:1) | 23.88 | 22.50 | 28.1 |
| Linoleic (C18:2) | 2.62 | 9.86 | 51.9 |
| Linolenic (C18:3) | 0.52 | 1.76 | 5.4 |
| Arachidic (C20) | 0.12 | 0.18 | 0.3 |
| Gadoleic | | | 0.4 |
| Behenic | | | 0.4 |
| Lignoceric | | | 0.1 |

EXAMPLE 4

Fat containing a concentration of approximately 60 percent by weight of trans fatty acids was abomasally infused into cows over a fourteen day trial. Three cows were infused with 0.45 kilograms per day of the trans fatty acids. The results of the trans fatty acid infusion are reported in Table 5.

In Trial 1, one cow suffered a displaced abomasum and was removed from the trial after seven days. Accordingly, the Day 14 results are a mean of the data from the two remaining cows. The fat, protein, and total solids percentage in the milk were decreased as indicated by the smaller concentrations on Day 14 as compared to Day 0. The percentage of lactose and ash were not changed by infusion. The results generally indicate that infusion of trans fatty acids decreased short and medium chain fatty acids ($C_4$–$C_{10}$) as well as $C_{12}$, $C_{14}$, and $C_{16}$. Longer chain fatty acids, such as $C_{18:1}$ cis and trans and $C_{18:2}$ trans were increased. The increase in trans fatty acids indicates that these fatty acids can be used directly for synthesis of milk fat from abomasal sources.

TABLE 5

Trans Fatty Acid Infusion

| Trial 1 | Day 0 | Day 3 | Day 7 | Day 14 |
|---|---|---|---|---|
| Ash (%) | 0.71 | 0.71 | 0.74 | 0.74 |
| Lactose (%) | 4.91 | 4.97 | 4.95 | 4.94 |
| Fat (%) | 4.11 | 4.01 | 4.17 | 3.89 |
| Protein (%) | 3.50 | 3.22 | 3.28 | 3.24 |
| Total Solids (%) | 13.26 | 12.94 | 13.01 | 12.80 |
| Butyric (C4) | 3.3 | 3.0 | 3.0 | 3.0 |
| Caproic (C6) | 2.2 | 2.1 | 1.8 | 2.0 |
| Caprylic (C8) | 1.4 | 1.4 | 1.1 | 1.1 |
| Capric (C10) | 3.3 | 3.2 | 2.4 | 2.4 |
| Lauric (C12) | 4.1 | 4.0 | 2.9 | 2.8 |
| Myristic (C14) | 12.0 | 11.6 | 10.0 | 9.6 |
| Myristoleic (C14:1) | 1.3 | 1.3 | 1.0 | 1.0 |
| Palmitic (C16) | 32.0 | 29.9 | 27.9 | 25.9 |
| Palmitoleic (C16:1) | 1.7 | 1.7 | 1.6 | 1.6 |
| Stearic (C18) | 11.4 | 10.8 | 13.1 | 12.5 |
| Oleic (C18:1 cis) | 21.9 | 22.3 | 25.4 | 27.4 |
| Elaidic (C18:1 trans) | 1.8 | 5.5 | 4.6 | 6.8 |
| Linoleic cis (C18:2) | 3.4 | 2.6 | 2.6 | 2.5 |
| Linoleic trans (C18:2) | 0.2 | 0.7 | 0.6 | 0.9 |
| Linolenic (C18:3) | 0.7 | 0.7 | 0.7 | 0.8 |
| Arachidic (C20) | 0.15 | 0.2 | 0.2 | 0.1 |

EXAMPLE 5

Medium chain fatty acids were abomasally infused in two trials. For each of these trials three cows were infused with one pound per day of the medium chain fatty acids. The results of the medium chain fatty acid infusion are reported in Table 6.

Infusion of medium chain fatty acids increased the percentage of fat in the milk. While Trial 2 displayed an increase in the protein percentage in the milk, the protein percentage in Trial 1 did not show an increase. Fatty acid analysis indicated that $C_{10}$ was increased and $C_{18:1}$ was decreased after infusion in both trials.

TABLE 6

Medium Chain Fatty Acids Infusion

| Trial 1 | Day 0 | Day 3 | Day 7 | Day 14 |
|---|---|---|---|---|
| Ash (%) | 0.67 | 0.66 | 0.72 | 0.73 |
| Lactose (%) | 4.89 | 4.94 | 4.71 | 4.71 |
| Fat (%) | 3.36 | 3.67 | 3.83 | 3.73 |
| Protein (%) | 2.87 | 2.85 | 2.91 | 2.88 |
| Total Solids (%) | 11.80 | 12.13 | 12.16 | 12.05 |
| Butyric (C4) | 4.10 | 4.07 | 4.53 | 4.53 |
| Caproic (C6) | 2.93 | 2.97 | 2.80 | 2.80 |
| Caprylic (C8) | 1.73 | 1.77 | 1.67 | 1.63 |
| Capric (C10) | 4.13 | 5.27 | 5.80 | 5.90 |
| Lauric (C12) | 4.43 | 4.67 | 4.53 | 4.63 |
| Myristic (C14) | 12.47 | 12.70 | 12.50 | 12.40 |
| Myristoleic (C14:1) | 0.90 | 0.90 | 0.86 | 0.83 |
| Palmitic (C16) | 32.73 | 33.87 | 35.50 | 34.70 |
| Palmitoleic (C16:1) | 1.70 | 1.73 | 1.80 | 1.63 |
| Stearic (C18) | 11.53 | 10.83 | 9.50 | 10.17 |
| Oleic (C18:1) | 20.53 | 19.43 | 17.83 | 17.63 |
| Linoleic (C18:2) | 2.37 | 2.20 | 2.20 | 2.23 |
| Linolenic (C18:3) | 0.6 | 0.6 | 0.56 | 0.50 |
| Arachidic (C20) | 0.0 | 0.0 | 0.10 | 0.13 |
| Ash (%) | 0.68 | 0.71 | 0.70 | 0.70 |
| Lactose (%) | 4.74 | 4.83 | 4.80 | 4.65 |
| Fat (%) | 3.13 | 3.98 | 3.56 | 3.19 |

TABLE 6-continued

Medium Chain Fatty Acids Infusion

| Trial 1 | Day 0 | Day 3 | Day 7 | Day 14 |
|---|---|---|---|---|
| Protein (%) | 3.15 | 3.41 | 3.32 | 3.24 |
| Total Solids (%) | 11.70 | 12.96 | 12.41 | 11.78 |
| Butyric (C4) | 3.6 | 3.5 | 3.5 | 3.5 |
| Caproic (C6) | 2.5 | 2.4 | 2.3 | 2.3 |
| Caprylic (C8) | 1.3 | 1.5 | 1.3 | 1.2 |
| Capric (C10) | 2.9 | 4.8 | 3.3 | 2.8 |
| Lauric (C12) | 3.3 | 3.8 | 3.4 | 2.9 |
| Myristic (C14) | 12.2 | 12.3 | 12.4 | 11.7 |
| Myristoleic (C14:1) | 1.2 | 1.0 | 1.1 | 1.1 |
| Palmitic (C16) | 33.4 | 32.7 | 34.6 | 33.8 |
| Palmitoleic (C16:1) | 1.8 | 1.5 | 1.7 | 1.8 |
| Stearic (C18) | 9.5 | 11.8 | 11.2 | 11.1 |
| Oleic (C18:1) | 25.1 | 21.9 | 22.7 | 24.8 |
| Linoleic (C18:2) | 2.6 | 1.9 | 2.0 | 2.1 |
| Linolenic (C18:3) | 0.4 | 0.3 | 0.3 | 0.4 |
| Arachidic (C20) | 0.1 | 0.1 | 0.1 | 0.1 |

Although the present invention has been described with reference to preferred embodiments, workers skilled in the art will recognize that changes may be made in form and detail without departing from the spirit and scope of the invention.

What is claimed is:

1. A method of formulating feed to be fed to a ruminant for selectively changing composition of milk produced by the ruminant, the method comprising:

providing a fistula directly into an abomasum of the ruminant;

introducing a selected feed component for changing a selected characteristic of the composition of the milk, the component being introduced at a selected level directly into the abomasum through the fistula thereby bypassing other portions of the ruminant's stomach;

analyzing the composition of the milk corresponding to the selected feed component to obtain data values;

repeating further introduction of the feed component at other selected levels to obtain additional data values; and determining a selected quantity of a rumen inert feed component to be fed orally to the ruminant by utilizing the data values obtained from the analysis of the composition of the milk corresponding to the introduction of the selected feed component into the abomasum of the ruminant.

2. The method of claim 1 wherein the selected feed component is selected to cause an increase in protein concentration in the milk produced by the ruminant.

3. The method of claim 1 wherein the selected feed component is selected to cause an increase in fat concentration in the milk produced by the ruminant.

4. The method of claim 1 wherein the selected feed component is selected to cause a decrease in fat concentration in the milk produced by the ruminant.

5. A method of formulating ruminant feed for obtaining a selected change in composition of milk produced by a ruminant, the method comprising the steps of:

infusing a selected feed component into an abomasum of the ruminant;

examining the milk composition at selected intervals corresponding to the infusion of the feed component into the abomasum to determine if the selected feed component produces a desired effect on the milk composition; and making the feed component rumen inert so that the rumen inert feed component produces the desired effect to the milk composition when the rumen inert feed component is orally consumed by the ruminant.

6. The method of claim 5 wherein the selected feed component is selected to cause an increase in protein concentration in the milk produced by the ruminant.

7. The method of claim 5 wherein the selected feed component is selected to cause an increase in fat concentration in the milk produced by the ruminant.

8. The method of claim 5 wherein the selected feed component is selected to cause a decrease in fat concentration in the milk produced by the ruminant.

* * * * *